Patented Jan. 23, 1945

2,368,006

UNITED STATES PATENT OFFICE 2,368,006

HETEROCYCLIC TERTIARY AMINES

John W. Cusic, Skokie, Ill., assignor to G. D. Searle & Co., Skokie, Ill., a corporation of Illinois No Drawing. Application October 7, 1943,
Serial No. 505,354

9 Claims. (Cl. 260—293)

This invention relates to new compounds which may be used as antispasmodic agents. More particularly, the invention relates to new compositions of matter which are tertiary araliphatic amines characterized by the presence of a heterocyclic nucleus in which at least one carbon atom is endowed with aliphatic properties, to which carbon atom an aminoalkyl or N-alkylpiperidyl group is attached. These compounds may be represented by the formulae:

(1) 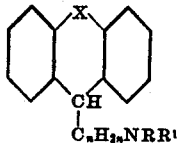

(2) 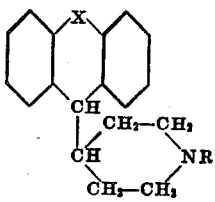

in which X represents an oxygen or sulfur atom, and in which $n$ represents the integer 2 or 3, and R and $R^1$ each represent an unsubstituted alkyl group containing not more than four carbon atoms. It will be observed that the compounds represented by these two formulae are closely related structurally; the second formula being derived from the first (where $n$ stands for 3 and $R^1$ for an ethyl group) merely by having the $R^1$ group attached to the side chain group at the first carbon atom. The compositions of this invention have been tested and found to be valuable antispasmodic agents.

Several different categories of synthetic antispasmodic agents have been described in the prior art, most of which, however, have been characterized by the presence of some functional group, such as an ester group, in addition to the tertiary amine configuration in their molecule. Blicke (Journal of American Chemical Society, volume 61, pages 91 and 771) has disclosed a group of tertiary amines, none of which contain any other functional group, and some of which are stated to be active antispasmodic agents. However, it is significant that all of the compounds which Blicke describes as active have two relatively large, aralkyl or hydrogenated aralkyl groups attached to the nitrogen atom, and that, conversely, all those compounds which have two simple alkyl groups (as in the present invention) attached to the nitrogen atom are described by him as "weak" or "inactive." The compounds of this invention thus differ notably from those of Blicke in that the aralkyl portion is heterocyclic; that there is but one such aralkyl group in the molecule; and that in some instances the nitrogen atom is itself a part of a cycloaliphatic ring.

I have found it impractical to prepare these amino compounds in the manner frequently used to obtain such configurations, namely, reaction of the corresponding halide with a simple secondary amine, since the necessary halides were not available. I have found it convenient to prepare the compounds of this invention by first metallating the polynuclear heterocyclic compound upon the carbon atom with aliphatic properties, and reacting this metallo derivative with the desired dialkylaminoalkyl halide. The following example is illustrative of this process:

Example

A solution of butyl lithium in dry ether is prepared from 27.4 grams of n-butyl bromide and 2.8 grams of lithium in the usual manner. To this is added 18.2 grams of xanthene, and the solution refluxed for two hours. The whole operation is preferably conducted under an atmosphere of nitrogen. At the end of this time, 13.5 grams of β-diethylaminoethyl chloride is added, and the resultant solution allowed to stand twelve or more hours with occasional stirring. A small amount of alcohol is added to decompose the remaining metallo-organic compounds, and the reaction mixture is extracted with dilute hydrochloric acid. The acid extract is made alkaline, and the free 9-(β-diethylaminoethyl) xanthene recovered by ether extraction and subsequent evaporation in the usual manner. The crude product may be purified by vacuum distillation; it is an oil which boils at 168° to 170° centigrade at 7 millimetres pressure. It is insoluble in water, but is readily soluble in the common organic solvents. It readily forms salts with acids, most of which are solid, crystalline compounds which are quite soluble in water. Though the free base is the source of the physiological utility of these compounds, they are more conveniently used in the form of salts, particularly the hydrochlorides. These salts are conveniently prepared by neutralizing a solution of the base in dry ether with an absolute alcohol solution of the desired acid. In this manner, the hydrochloride was obtained as a crystalline compound which melts at 167° to 168° centigrade.

The above example is illustrative only; the use of thioxanthene in place of xanthene, or of different dialkylaminoalkyl halides (including N-alkyl, 4-halogen piperidines) in place of the one specified will result in the formation of the other compounds contemplated within this invention. Among the compounds thus prepared are 9-(β-dibutylaminoethyl) xanthene, 9-(γ-diethylaminopropyl) xanthene, 9-(β-diethylaminoethyl) thioxanthene, 9-(γ-diethylaminopropyl) thioxanthene, and 9-(N-methyl-piperidyl-4) xanthene.

The antispasmodic value of these compounds has been demonstrated by comparing their effect in relaxing rabbit intestinal and uterine strips, both in their normal condition and after stimulation with such drugs as acetylcholine, with the effect of known drugs which have found extensive utility in the clinical practice of medicine. In this way, at least three preferred embodiments of this invention ((9-(β-diethylaminoethyl) xanthene, 9-(β-diethylaminoethyl) thioxanthene, and 9-(N-methylpiperidyl-4) xanthene)) have shown themselves to be equal to or superior in potency to the β-diethylaminoethyl ester of fluorene-9-carboxylic acid (United States Letters Patent No. 2,262,754), a drug which is now finding wide acceptance as a spasmolytic agent in this country. These compounds vary among themselves somewhat in toxicity, but in each case the therapeutic effective dose is but a small fraction of the toxic dose, so that they may be quite safely administered to man or animals in effective doses, without undesirable side effects.

It is to be understood that the amines as referred to in the following claims are intended to refer to the compounds described therein, whether they be in the form of the free base or of a salt with a non-toxic acid.

I claim:

1. New compositions of matter comprising heterocyclic tertiary amines of the formula

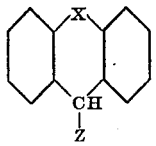

wherein X represents a member of the group consisting of oxygen and sulfur and wherein Z represents a member of the group consisting of a dialkylaminoalkyl radical of the formula —$C_nH_{2n}NRR^1$ and an N-alkyl-piperidyl radical of the formula:

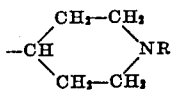

in which formulae $n$ stands for an integer between 1 and 4 and R and $R^1$ each represent an unsubstituted alkyl group containing not more than four carbon atoms.

2. New compositions of matter comprising heterocyclic tertiary amines of the formula:

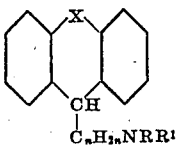

wherein X represents a member of the group consisting of oxygen and sulfur, $n$ stands for an integer between 1 and 4, and R and $R^1$ each represent an unsubstituted alkyl group containing not more than four carbon atoms.

3. New compositions of matter comprising heterocyclic tertiary amines of the formula:

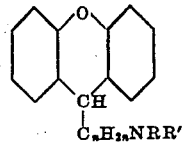

wherein $n$ stands for an integer between 1 and 4 and R and $R^1$ each represent unsubstituted alkyl groups containing not more than four carbon atoms.

4. A new composition of matter comprising 9-(β-diethylaminoethyl) xanthene of the formula:

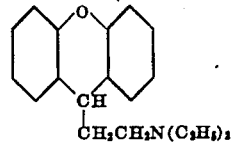

5. New compositions of matter comprising ocyclic tertiary amines of the formula:

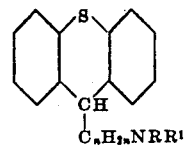

wherein $n$ stands for an integer between 1 and 4 and R and $R^1$ each represent an unsubstituted alkyl group containing not more than four carbon atoms.

6. A new composition of matter comprising 9-(β-diethylaminoethyl) thioxanthene of the formula:

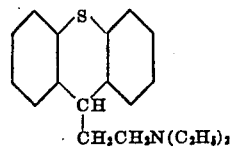

7. New compositions of matter comprising heterocyclic tertiary amines of the formula:

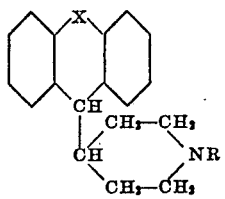

wherein X represents a member of the group consisting of oxygen and sulfur and R represents an unsubstituted alkyl group containing not more than four carbon atoms.

8. New compositions of matter comprising heterocyclic tertiary amines of the formula:

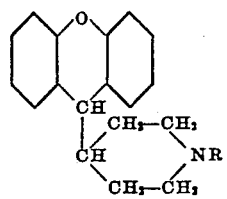

wherein R represents an unsubstituted alkyl group containing not more than four carbon atoms.

9. A new composition of matter comprising 9-(N-methylpyridyl-4) xanthene of the formula:

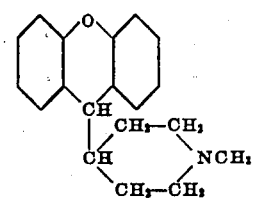

JOHN W. CUSIC.

CERTIFICATE OF CORRECTION.

Patent No. 2,368,006. January 23, 1945.

JOHN W. CUSIC.

It is hereby certified that error appears in the printed specification of the above numbered patent requiring correction as follows: Page 2, first column, line 74, claim 3, for that portion of the formula reading " NRR' " read -- $NRR^1$ --; page 2, second column, line 14, claim 5, for "ocyclic" read --heterocyclic--; and that the said Letters Patent should be read with this correction therein that the same may conform to the record of the case in the Patent Office.

Signed and sealed this 24th day of April, A. D. 1945.

Leslie Frazer (Seal)                  Acting Commissioner of Patents.